(12) United States Patent
Gibbs et al.

(10) Patent No.: US 7,348,973 B1
(45) Date of Patent: Mar. 25, 2008

(54) MODELING HAIR USING INTERPOLATION AND CLUMPING IN AN ITERATIVE PROCESS

(75) Inventors: Jonathan D. Gibbs, San Carlos, CA (US); David A. Hart, San Francisco, CA (US)

(73) Assignee: Pacific Data Images LLC, Redwood City, CA (US)

( * ) Notice: Subject to any disclaimer, the term of this patent is extended or adjusted under 35 U.S.C. 154(b) by 195 days.

(21) Appl. No.: 10/848,241

(22) Filed: May 17, 2004

(51) Int. Cl.
*G06T 15/00* (2006.01)

(52) U.S. Cl. .................................................. 345/419

(58) Field of Classification Search ............... None
See application file for complete search history.

(56) References Cited

U.S. PATENT DOCUMENTS

| | | | |
|---|---|---|---|
| 6,720,962 B1 | | 4/2004 | Alter |
| 6,940,508 B2 * | | 9/2005 | Lengyel .................... 345/428 |
| 2002/0057278 A1 * | | 5/2002 | Bruderlin .................... 345/582 |

OTHER PUBLICATIONS

Bruderlin, Armin, *A Basic Hair/Fur Pipeline*, Notes from Course 34; Photorealistic Hair Modeling, Animation and Rendering, The 30th Int'l. Conference on Computer Graphics and Interactive Techniques (SIGGRAPH), Jul. 29, 2003, San Diego, CA.

Chang, Johnny T. et al., *A Practical Model for Hair Mutual Interactions*, Proceedings of the 2002 ACM SIGGRAPH/Eurographics Symposium on Computer Animation, 2002, pp. 73-80, 192.

Daldegan, Agnes et al., *An Integrated System for Modeling, Animating and Rendering Hair*, Computer Graphics Forum, 1993, 12(3), pp. 211-221.

Hadap, Sunil et al., *Hair Shape as Streamlines of Fluid Flow*, The 30th Int'l. Conference on Computer Graphics and Interactive Techniques (SIGGRAPH), Jul. 29, 2003, San Diego, CA, pp. 1-21.

Hadap, Sunil et al., *Modeling Dynamic Hair as a Continuum*, . EUROGRAPHICS 2001, vol. 20, No. 3.

Hanson, Andrew, J. and MA, Hui, *Technical Report 425: Parallel Transport Approach to Curve Framing*, Department of Computer Science, Indiana University, Jan. 1995, pp. 1-20.

Kim, Tae-Yong, *Algorithms for Hardware Accelerated Hair Rendering*, The 30th Int'l. Conference on Computer Graphics and Interactive Techniques (SIGGRAPH), Jul. 29, 2003, San Diego, CA.

Kim, Tae-Yong et al., *Interactive Multiresolution Hair Modeling and Editing*, ACM Transactions on Graphics, 2002, pp. 620-629, 21(3).

(Continued)

*Primary Examiner*—Ulka Chauhan
*Assistant Examiner*—Daniel F Hajnik
(74) *Attorney, Agent, or Firm*—Morrison & Foerster LLP

(57) ABSTRACT

The present invention models hairs by generating hairs by interpolation and then further modifying the interpolated hairs to form clumps. The modified hairs can be iteratively reprocessed to generate more hairs and thereby produce a greater level of detail in the resulting hairstyle. The invention can be used to model any tubular structures protruding from a surface, such as strands of fur protruding from an animal's skin and blades of grass or stems of plants protruding from the ground.

37 Claims, 7 Drawing Sheets

OTHER PUBLICATIONS

Lee, Doo-Won and Ko, Hyeong-Seok, *Natural Hairstyle Modeling and Animation*, Graphical Models, 2001, pp. 67-85, vol. 63, Issue 2.

Magnenat-Thalmann, Nadia et al., *Animating Hair With Free-Form Deformations*, ACM Symposium on Virtual Reality Software and Technology, 2004.

Magnenat-Thalmann, Nadia et al., *State of the Art in Hair Simulation*, International Workshop on Human Modeling and Animation, Seoul, Korea, Jun. 2002, pp. 3-9.

Magnenat-Thalmann, Nadia et al., Notes from Course 9: Photorealistic Hair Modeling, Animation, and Rendering, The 31st International Conference on Computer Graphics and Interactive Techniques (SIGGRAPH), Aug. 8, 2004, Los Angeles, CA.

Magnenat-Thalmann, Nadia et al., Notes from Course 34: Photorealistic Hair Modeling, Animation and Rendering, The 30th Int'l. Conference on Computer Graphics and Interactive Techniques (SIGGRAPH), Jul. 29, 2003, San Diego, CA.

Patrick, Deborah and Bangay, Shaun, *A LightWave 3D Plug-in for Modeling Long Hair on Virtual Humans*, Association for Computing Machinery, Inc., 2003, pp. 161-166, 188.

Rijpkema, Hans, *Fur Grooming at Rhythm and Hues Studios*, Notes from Course 9: Photorealistic Hair Modeling, Animation, and Rendering, The 31st International Conference on Computer Graphics and Interactive Techniques (SIGGRAPH), Aug. 8, 2004, Los Angeles, CA.

Ward, Kelly and Lin, Ming C., *Adaptive Grouping and Subdivision for Simulating Hair Dynamics*, 11th Pacific Conference on Computer Graphics and Applications (PG'03), Oct. 2003.

Ward, Kelly et al., *Modeling Hair Using Level-of-Detail Representations*, Proceedings of the 16th International Conference on Computer Animation and Social Agents (CASA), May 2003.

Yu, Yizhou et al., *Efficient and Realistic Hair Animation Using Sparse Guide Hairs*, University of Illinois at Urbana-Champaign, Computer Science Department, 2002.

Alter, Joseph, *Shave and a Haircut Version 2.7*, 1999-2004, [online] [retrieved on Nov. 30, 2004] Retrieved from the internet <URL:http://www.joealter.com/newSite/softloads/Manual.pdf>.

Buhler, Juan et al., *Visual Effects in Shrek*, Mar. 2001, [online] [retrieved on Nov. 19, 2004] Retrieved from the internet<URL:http://silicon-valley.siggraph.org/MeetingNotes/Shrek.html>.

Gibbs, Jonathan, *Rendering Skin and Hair*, Mar. 2001, [online] [retrieved on Nov. 30, 2004] Retrieved from the internet<http://silicon-valley.siggraph.org/MeetingNotes/shrek/hairskin.pdf>.

Steamboat Software, Inc., *Hair Geometry Engine*, [online] [retrieved on Nov. 30, 2004] Retrieved from the internet<URL:http://www.steamboat-software.com/Support/archive/hair/Hair_Geometry_Engine_Page_1.html>.

Steamboat Software, Inc., *Photorealistic Hair Rendering*, [online] [retrieved on Jul. 28, 2003] retrieved from the internet<URL:http://www.steamboat-software.com/jighair.html>.

Turbo Squid, Inc., *Plug-ins Other Hair procedural Fur: Hairfx*, [online] [retrieved on Nov. 19, 2004] Retrieved from the internet<URL:http://www.turbosquid.com/FullPreview/index.cfm/ID/229960>.

Steamboat Software, Inc., *What is Jig?*, [online] [retrieved on Jul. 28, 2003] Retrieved from the internet<URL:http://www.steamboat-software.com/jigwhat.html>.

* cited by examiner

MODELING HAIR USING INTERPOLATION AND CLUMPING IN AN ITERATIVE PROCESS

BACKGROUND OF THE INVENTION

1. Field of the Invention

This invention relates generally to computer graphics and, more specifically, to using computer systems to model hair.

2. Background Art

Computers are widely used to model figures, from insects and monsters to human beings. While it is relatively easy to use a computer to create and position the larger, simpler body parts of a figure (such as the head, torso, and limbs), it is much more difficult to create and position the smaller, more detailed body parts such as hair and fur. Hair and fur are especially difficult to model because each strand must be created and positioned separately. Since one figure is often covered by thousands of strands of hair or fur, it is obvious that these strands cannot all be created and positioned manually.

Human hair is even more difficult to model than fur because of its length and the variety of possible styles. A real human head contains about 100,000-200,000 strands of hair. And for each head of hair, there are dozens, if not hundreds, of possible hairstyles. Art directors often have particular hairstyles in mind, and computers must be able to generate these hairstyles in order to be useful.

In the past, there have been three major approaches to modeling hair: the texture map approach, the cluster approach, and the interpolation approach. In the texture map approach, a user paints areas on a figure to specify different characteristics of the hairs growing out of that area. For example, one map might specify hair length, where the area near the forehead is painted so that the hairs will be short, while the area near the back of the head is painted so that the hairs will be long. Another example is specifying the direction of hair growth, such that hairs in one area grow out perpendicularly to the head, while hairs in another area grow out close to the head. Texture maps have also been used to specify density and shape.

While texture maps may be used to specify a variety of characteristics for a hairstyle, it is difficult to use texture maps in order to create complex hairstyles. Since each texture map addresses only one characteristic at a time for a given hair, multiple texture maps are necessary in order to specify multiple characteristics for a given hair. Specifying and modifying multiple texture maps can become labor intensive, so frequently texture maps are used for only gross control of shape, and the number of texture maps used is limited as much as possible. In addition, texture maps are generally a non-intuitive and inefficient way to style hair, depending on which characteristics the texture maps are specifying. As a result, it is frequently easier to create a complex hairstyle by directly modeling the shape curves of the hairs. These limitations make texture maps most useful for simple hairstyles.

In the cluster approach (also known as the wisp approach), the user manually creates and positions hair tubes. These tubes have diameters much larger than the diameters of individual hairs. Thus, fewer tubes are needed to cover an area compared to the number of hairs needed to cover that same area. During rendering, each tube is filled with many hairs, so that the hairs follow the direction of the tube. While the cluster approach does allow for individual hair variations within a given tube, these variations usually rely on random values to modify hairs and thus are not very controllable by users. Thus, the cluster approach is best for straight hair. The other problem with the cluster approach is that the resulting hairstyle always looks like a lot of hairs in tubes, rather than a real hairstyle.

In the interpolation approach, the user manually creates and positions several guide hairs. While the appropriate number of guide hairs depends on how much manual control the user needs at this phase, for many hairstyles, the number tends to be about 40-100. These guide hairs, also known as control hairs, possess certain characteristics, such as size and shape, and help define key aspects of the hairstyle. The computer uses interpolation to automatically generate hairs to fill in the gaps between the guide hairs. These interpolated hairs have characteristic values similar to those of the surrounding guide hairs. The actual characteristic values assigned to an interpolated hair are based on the origin of the interpolated hair. Many interpolation methods exist and may be used. In one embodiment, the guide hairs that are closer to the interpolated hair (based on the origins of the guide hairs and the origin of the interpolated hair) affect the characteristic values of the interpolated hair more than the guide hairs that are farther from the interpolated hair. This is known as a radial basis function. For example, if three interpolated hairs are evenly spaced between two guide hairs, the interpolated hairs closest to a guide hair will mostly resemble (via characteristic values) that guide hair, and the interpolated hair in the middle will be a mixture of the two guide hairs.

The interpolation approach also enables a user to specify a blending weight for each guide hair. A large blending weight increases the effect of a guide hair on a characteristic value of an interpolated hair, while a small blending weight decreases the effect of a guide hair on a characteristic value of an interpolated hair. The problem with the interpolation approach is that it results in artifacts, such as hairs that stand up straight between two guide hairs that go left and right. Also, the interpolation approach cannot be used for clumpy hairstyles, since interpolation tends to create a very smooth distribution of hairs.

What is needed is a way to model hair that enables users to design complex and realistic hairstyles without requiring each hair to be created and positioned manually.

SUMMARY OF THE INVENTION

A surface model, guide hairs, and clump hairs are input into a software component called a fur engine. The fur engine generates interpolated hairs based on the guide hairs. The fur engine modifies ("clumps") the interpolated hairs based on the clump hairs. A clump hair has a radius value and a clumpiness value. When clumping a given hair, the clump hair to which the given hair is attracted is determined. A reference hair is calculated that represents where a given hair would be were it fully attracted to its clump hair. The given hair's clumpiness value is calculated. The clumpiness value represents how attracted the given hair is to its clump hair. The given hair is clumped by calculating new positions for its points and interpolating a curve through them. After the given hair has been clumped, it may also be styled to include twists, curls, and kinks.

DETAILED DESCRIPTIONS OF THE EMBODIMENTS

For simplicity purposes, the invention is described in the context of modeling hairs on a human head. However, the invention may be used to model any tubular structures protruding from a surface, such as strands of fur protruding from an animal's skin, strands of fibers protruding from a carpet, and blades of grass or stems of plants protruding from the ground. For purposes of generality, the terms "strand" and "hair" are used herein interchangeably and include hair, fur, grass, stems, fibers, and any similar tubular structures protruding from a surface.

Figure 1:
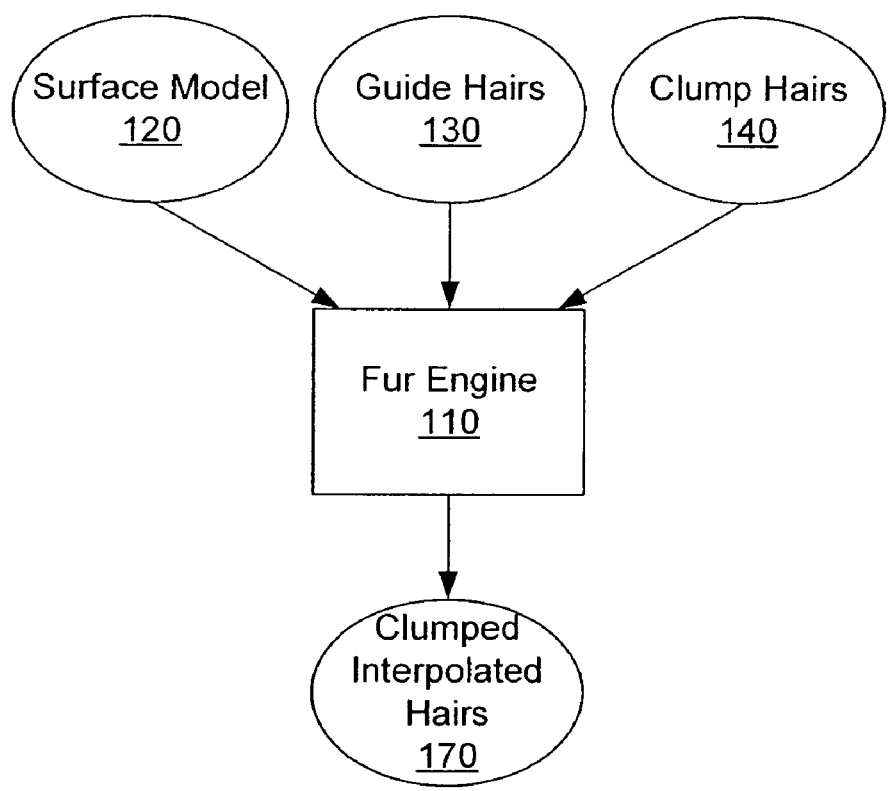
FIG. 1 illustrates a block diagram overview of the use of one embodiment of a software component for modeling hair.

FIG. 1 illustrates a block diagram overview of the use of one embodiment of a software component for modeling hair. FIG. 1 includes a fur engine 110, a surface model 120, guide hairs 130, clump hairs 140, and clumped interpolated hairs 170. Fur engine 110 is a software component used to model hair. The inputs of the fur engine 110 are a surface model 120, one or more guide hairs 130, and one or more clump hairs 140. The output of the fur engine 110 is clumped interpolated hairs 170.

One of the inputs to the fur engine 110 is a surface model 120. The surface model 120 is the surface on which the hairs will be modeled. In the hair context, the surface model is typically part of a character, such as a character's head. In the grass context, the surface model would be a field or other region of ground or land. The surface model may be built using a variety of methods known to those skilled in the art, such as scanning or creating a model from scratch using a computer graphics product such as Maya® from Alias Systems. The surface model may comprise, for example, polygons, parametric surfaces (such as NURBS (NonUniform Rational B-Splines)), and/or subdivision surfaces.

In one embodiment, a second surface model, sometimes called a scalp model or skin model, is created. The second model sits on top of the first model, and the modeled hairs are placed on the second model. In this way, the second model acts as a layer of abstraction between the modeled hairs and the underlying character model, thereby insulating the modeled hairs from changes to the underlying character model. A second surface model is useful, for example, when the first model is a combination of many different surfaces that have been connected together. In this embodiment, the second model is input into the fur engine 110, not the first model.

The other two inputs to the fur engine 110 are guide hairs 130 and clump hairs 140. As their names imply, guide hairs 130 and clump hairs 140 are both hairs. In real life, a hair is usually thought of as a curved line. In the fur engine 110, each hair is a set of vertices in three-dimensional space with a defined interpolation through the vertices. This interpolation forms a curved three-dimensional line. Examples of curve interpolations include B-splines and NURBS. Hairs within the fur engine 110 can be, for example, any type of parametric curve or subdivision curve.

Each vertex of a hair thus has at least three values associated with it: an x-coordinate, a y-coordinate, and a z-coordinate. Together, these three values describe the position of the vertex. Additional values may also be associated with a vertex, such as a radius value or a clumpiness value, which will be further discussed below. Each value is associated with one characteristic of a hair. The vertices of a single hair may or may not all have the same value for a particular characteristic. Since the values of a particular characteristic may differ among vertices in the same hair, the set of values for a particular characteristic is sometimes referred to as a "track." Each characteristic of a hair has a track that contains the values of that characteristic at each vertex, ordered according to the order of the vertices in the hair.

As mentioned above, although the position of a hair is specified at only the vertices of a hair, the position of the rest of the hair is determined by interpolating a curve through the vertices. Similarly, values for a particular characteristic for points on a hair other than vertices are determined by interpolating through the points specified by the track. The information stored in a track can be represented as a set of pairs of the type <vertex, value>, where value is the value of a particular characteristic at vertex. If these pairs are then graphed as points in two dimensions (the dimensions being vertex and value), the curve interpolated through the points specifies the value of that characteristic at all points on the hair. In this way, a characteristic value can be determined for any point on a hair, even though only a few characteristic values (i.e., those belonging to vertices) are actually stored in memory.

Each hair that is modeled on a surface, such as the hairs that are inputs and outputs of fur engine 110, also has an "origin." This origin is defined as where the interpolated curve intersects the surface model 120. Guide hairs 130 and clump hairs 140 will be further discussed below with reference to FIG. 2.

After the fur engine 110 has created clumped interpolated hairs 170, the fur engine 110 may perform another iteration. An additional iteration increases the total number of clumped interpolated hairs 170 output by the fur engine 110. The greater the number of hairs that have been created, the more detailed the resulting hairstyle will be. Thus, performing an additional iteration increases the level of detail of the hairstyle.

Each additional iteration requires a surface model 120, guide hairs 130, and clump hairs 140, just like the initial iteration. While additional iterations usually use the same model 120 (so that the output clumped interpolated hairs 170 are used for the same figure), the guide hairs 130 and clump hairs 140 frequently differ. In one embodiment, the guide hairs 130 used in a second iteration are the clumped interpolated hairs 170 output by the first iteration. In another embodiment, a user creates a new set of guide hairs 130 for the second iteration or uses the same guide hairs 130 for the second iteration as were used for the first iteration. Clump hairs 140 may also differ from iteration to iteration. In addition, any settings or options (described below) that are used by the fur engine 110 may also differ between iterations.

A user may decide whether he wants another iteration to be performed after he has examined the current status of the hairstyle. Alternatively, he may specify when he first runs the fur engine 110 a particular number of iterations to be performed and the surface model 120, guide hairs 130, clump hairs 140, and settings and options to be used in each iteration. After the user is satisfied with the hairstyle, the hairs may be further processed in order to add special effects such as lighting and shadows. For example, the hairs may be input into a rendering engine.

Figure 2:
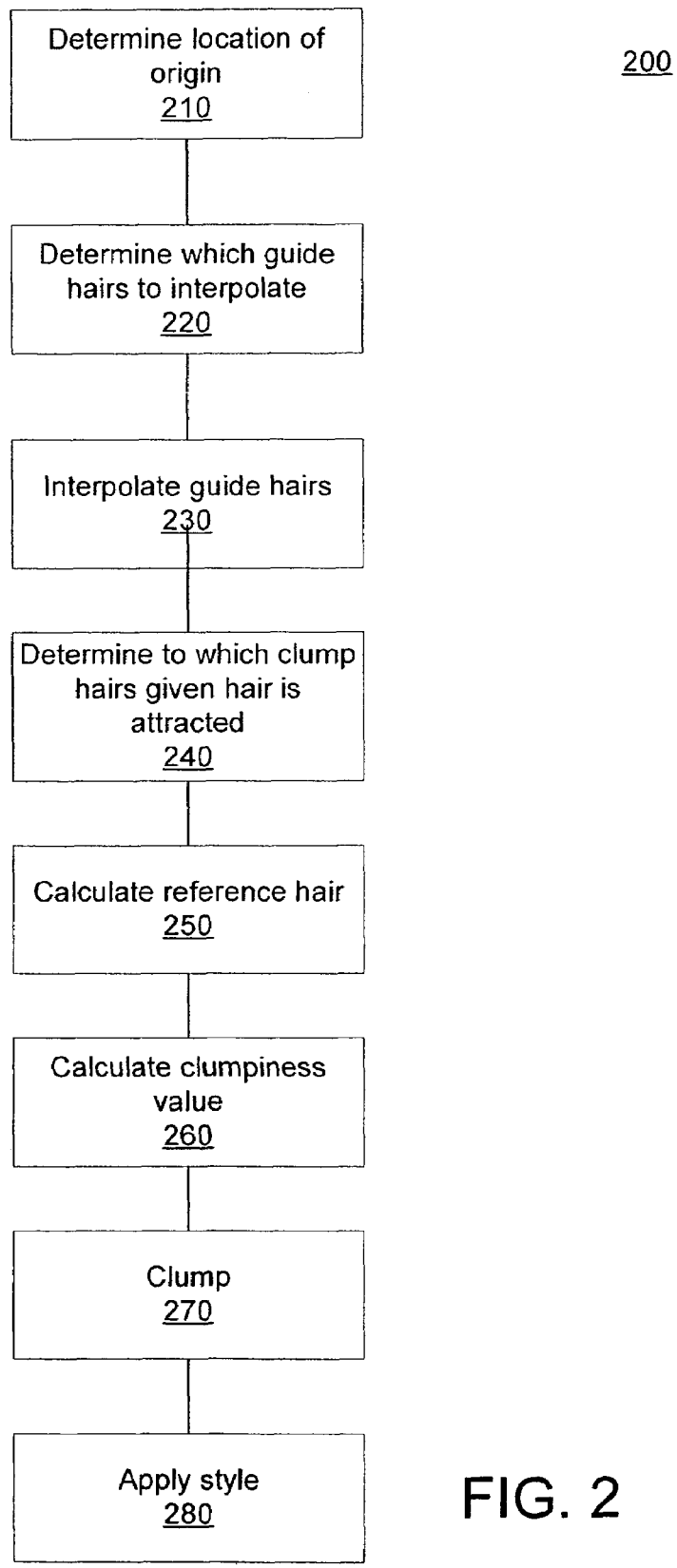
FIG. 2 illustrates a flowchart of a method for generating a hair performed by the above software component, according to one embodiment of the invention.

FIG. 2 illustrates a flowchart of a method for generating a hair performed by the above software component, according to one embodiment of the invention. The method 200 of FIG. 2 comprises determining the location of an origin for the hair that will be generated (step 210), interpolating the hair (steps 220 and 230), clumping the hair (steps 240, 250, 260, and 270), and styling the hair (step 280). These steps will be further described below.

Figure 3A:
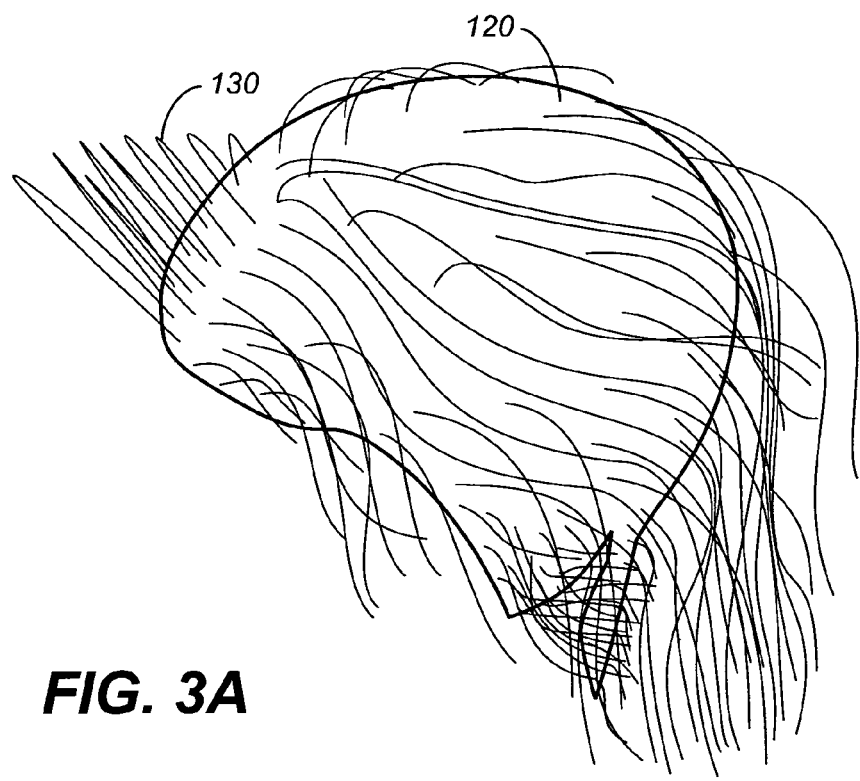
FIG. 3A illustrates a surface model and guide hairs, according to one embodiment of the invention.

Recall that the fur engine 110 takes as inputs a surface model 120, one or more guide hairs 130, and one or more clump hairs 140. Before method 200 begins, a user creates a surface model 120, one or more guide hairs 130, and one or more clump hairs 140. A user may create hairs manually, or he may use software to generate hairs based on one or more factors. These factors may include, for example, the desired number of hairs, the region where the hairs should be distributed, how evenly the hairs should be distributed, and the specific characteristics and characteristic values to assign to the hairs. Regardless of how the guide hairs 130 and clump hairs 140 are created, they are positioned on the surface model 120 before they are input into the fur engine 110. A hair may function as both a guide hair 130 and a clump hair 140. FIG. 3A illustrates a surface model and guide hairs, according to one embodiment of the invention.

The first step of method 200 is to determine 210 where the newly-created hair will protrude from the surface model 120, i.e., the location of the hair's origin. In one embodiment, rejection sampling is used to bias against placing new hairs in compressed regions of the surface 120. An origin is in a compressed region if the ratio of the magnitude of the tangent to the surface 120 at the origin to the maximum magnitude of any tangent to the entire surface 120 is relatively small. Rejection sampling may be implemented by using the value of this ratio as the probability that a particular origin will be accepted and not discarded so that a new origin must be chosen. Thus, a newly-chosen origin in a highly compressed region is more likely to be discarded than a newly-chosen origin in a lightly compressed region. Specifically, to choose a new origin in one embodiment, a random point P on the surface is chosen. This point is then conditionally accepted with the probability [M(P)]/[M (P$_{max}$)], where M(P) is the product of the magnitudes (lengths) of the two first partial derivatives on the surface 120 at a point P, and P$_{max}$ is the point on the surface 120 where the product of the magnitudes (lengths) of the two first partial derivatives on the surface 120 is maximized. If the P is rejected, then a new random point is chosen and the process is repeated. In another embodiment, a location on the surface model 120 is randomly chosen and then adjusted such that the origin of the new hair will be equidistant from the origins of the closest existing hairs.

In yet another embodiment, the origin location is specified by the user. The user may manually input the location by, for example, typing in the coordinates or selecting allocation on the screen. Alternatively, the user may provide a file that contains the location. In one embodiment, after the location of an origin has been calculated (no matter whether it was determined by the fur engine 110 or specified by the user), the location is stored in a file. This file may eventually contain hundreds or thousands of origin locations, one for each newly-created hair. The file may then be used to specify origin points for other hairstyles and/or other surface models 120, or for future iterations of the same hairstyle and surface model 120. The user may also edit origin locations by editing the file, rather than by editing the locations manually.

Once it has been calculated, the location of the origin will be used by the interpolation process in steps 220 and 230.

Interpolation

The next step is to determine 220 which guide hairs 130 to interpolate to generate the new hair. This calculation depends on the interpolation method chosen. There are three types of interpolation. These three types may be used in isolation (such that one type of interpolation is used to generate interpolated hairs for the entire surface model 120) or together (such that different types of interpolation are used to generate interpolated hairs for different parts of the surface model 120). The first type of interpolation, which is mesh-based and is used in a preferred embodiment, allows a user to place guide hairs 130 anywhere on the surface model 120. After the guide hairs 130 have been placed, a triangular mesh 300 is built by using a triangulation algorithm, such as the Delaunay method, or by creating the mesh manually. The vertices 310 of the mesh 300 are the origins of guide hairs 130, and the edges 320 of the mesh 300 are lines connecting these vertices 310. In one embodiment, the data representation of each vertex 310 includes a reference to the guide hair 130 whose origin was used as the vertex 310.

Figure 3B:
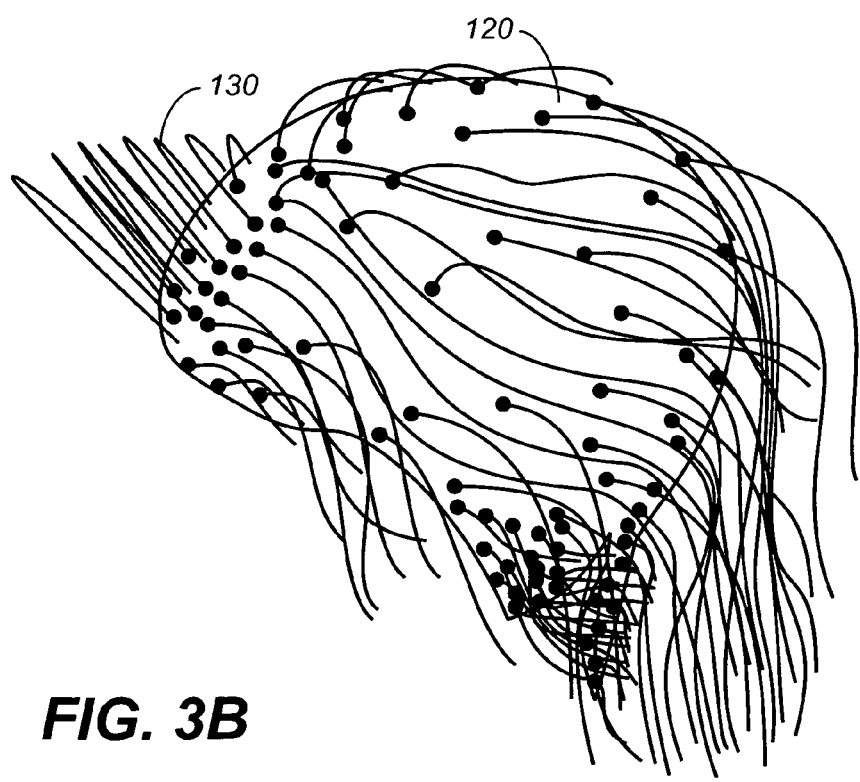
FIG. 3B illustrates the surface model and guide hairs of FIG. 3A and origins of the guide hairs, according to one embodiment of the invention.
Figure 3C:
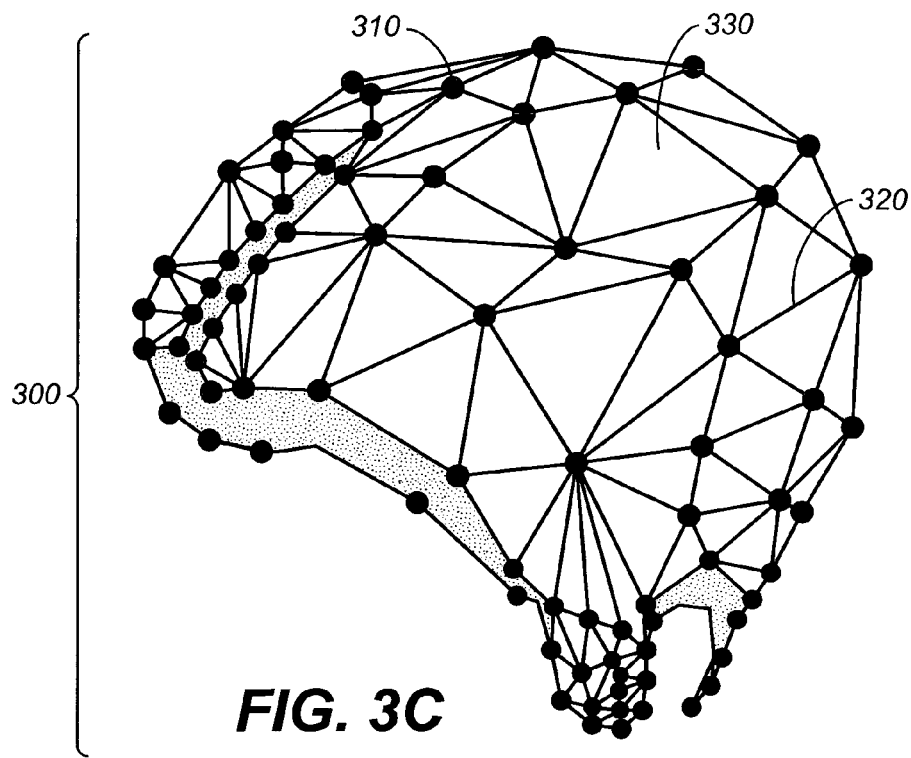
FIG. 3C illustrates the surface model and guide hair origins of FIG. 3B and a triangular mesh formed by connecting the guide hair origins, according to one embodiment of the invention.

FIG. 3B illustrates the surface model and guide hairs of FIG. 3A and origins of the guide hairs, according to one embodiment of the invention. FIG. 3C illustrates the surface model and guide hair origins of FIG. 3B and a triangular mesh formed by connecting the guide hair origins, according to one embodiment of the invention. Each triangular face 330 in the mesh 300 defines an area of the surface model 120, and any hair "grown" in that area will be interpolated based on the three guide hairs 130 whose origins form the vertices 310 of the triangular face 330. In a preferred embodiment, a three-dimensional surface model 120 is transformed into a two-dimensional surface model (using either the implicit two-dimensional surface or the NURBS surface), and then triangulation is performed on the vertices 310 (guide hair origins) to form a mesh 300. If the surface model 120 comprises multiple sections of three-dimensional surfaces, each section is triangulated separately, and then all of the sections are reassembled into one mesh 300.

In one embodiment, the mesh 300 is modified after it has been created. For example, another row of triangulation is added to the boundaries of the mesh 300 in order to decrease boundary effects. Alternatively, the user partitions the mesh 300 and specifies areas where interpolation should not cross region boundaries. This prevents the generation of a hair from two adjacent guide hairs 130 that exist in different regions. One example of this would be a "part" in a hairstyle, where hairs in different regions aim in different directions. In another embodiment, the user is able to manually adjust the vertices 310 of the mesh 300.

The second type of interpolation, radial-basis-function interpolation, generates a hair based on the characteristics of guide hairs 130 located within a predefined distance of the origin of the new hair. The influence of each guide hair 130 is based on its distance from the origin of the new hair. The closer a guide hair 130 is to the origin of a new hair, the more influence that guide hair 130 will exert. The new hair is thus interpolated based on a blended weighted average of nearby guide hairs 130. The problem with this type of interpolation is that the user has very little control over the interpolation, and guide hairs 130 with outlier characteristics severely affect hair growth. Also, this type of interpolation produces odd artifacts from distant guide hairs 130 with opposing (canceling) shapes.

The third type of interpolation, commonly known as "surface connectivity-based interpolation," is similar to the first type in that it is mesh-based. However, instead of creating the mesh after the fact from the guide hairs 130, the mesh from the surface model 120 is used directly. The interpolation method used to interpolation the hairs is the same interpolation method that was used to tessellate the surface model 120. As a result, a guide hair 130 must exist at every vertex of the surface model 120. For polygon models, this is a linear interpolation similar to what is used in the first method. For parametric surfaces or subdivision surfaces, the curve interpolation function can be used.

Thus, the fur engine 110 determines 220 which guide hairs 130 to interpolate to generate the new hair based on one of the interpolation methods described above. Specifically, this step includes identifying the three guide hairs 130 whose origins form the vertices 310 of the triangular face 330 in the mesh 300 that contains the origin of the new hair. This is performed by determining which triangular face 330 is closest to the origin of the new hair. Although any interpolation method may be used with this invention, for simplicity purposes, the invention will be described in the context of the first, preferred, interpolation method.

The next step is to interpolate 230 these guide hairs 130 to generate the new hair. In a preferred embodiment, this is done by calculating the blended weighted average of the three guide hairs 130. Specifically, the barycentric coordinates of the origin of the new hair with respect to the three vertices 310 of the triangular face 330 are determined. The barycentric coordinates of a point P (such as the origin of the new hair) in a triangle T (such as the triangular face 330) are three numbers which, when multiplied by the corresponding Cartesian positions of the vertices of T and then summed, result in the Cartesian coordinates of point P.

Figure 3D:
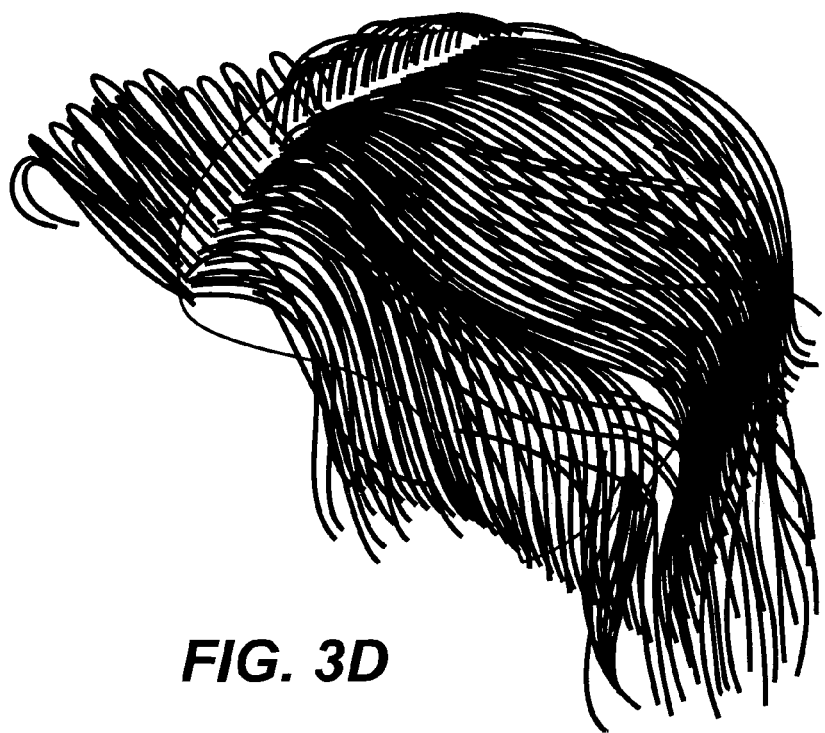
FIG. 3D illustrates the surface model and guide hairs of FIG. 3A and hairs that have been generated by interpolating the guide hairs, according to one embodiment of the invention.

The barycentric coordinates are then used as the blending weights for interpolating the guide hairs 130 to form the new hair. In one embodiment, the blending is positional. Positional blending calculates the product of the $n^{th}$ vertex of each guide hair 130 and the blending weight of the associated guide hair 130 and then sums the three products (one for each guide hair 130) to yield the value of the $n^{th}$ vertex of the new (interpolated) hair. In another embodiment, the blending is directional. Directional blending calculates the $n^{th}$ vertex of the interpolated hair by adding the interpolated direction vector to the $(n-1)^{th}$ vertex of the interpolated hair, where the interpolated direction vector is the weighted sum of the corresponding guide hair 130 directions and the vector going from the $(n-1)^{th}$ vertex to the $n^{th}$ vertex. FIG. 3D illustrates the surface model and guide hairs of FIG. 3A and hairs that have been generated by interpolating the guide hairs, according to one embodiment of the invention.

In one embodiment, an interpolated hair has a radius characteristic. The value of this characteristic determines the visible width of the interpolated hair if/when the interpolated hair is rendered. The radius value of an interpolated hair may be specified by the user. In one embodiment, a guide hair 130 can affect the radius value of an interpolated hair if the interpolated hair was interpolated based on that guide hair 130. A guide hair 130 may, for example, have its own radius characteristic. In this embodiment, the final radius value of an interpolated hair is the product of the initially-specified radius value of the interpolated hair and the radius value of the guide hair 130 that was used for interpolation. Similar to other characteristics of a hair, a radius value may vary along the length of the hair. After a radius value has been determined for each vertex, radius values for other points in the hair are determined based on an interpolated curve through the points of the radius track. Values for other characteristics of a hair may also be interpolated in a similar fashion.

In another embodiment, the data representation of an interpolated hair contains references to the guide hairs 130 that were interpolated to create the interpolated hair.

Clumping

In the clumping phase, the fur engine 110 clumps the interpolated hairs according to the clump hairs 140 to produce clumped interpolated hairs. Specifically, a given hair's final position is determined by calculating the final position of several points along the given hair and then interpolating a curve through them. In a preferred embodiment, these several points are the hair's control vertices.

While guide hairs 130 are used to generate interpolated hairs, clump hairs 140 are used to modify given hairs (such as interpolated hairs) and to create "clumps" in the hairstyle. Clump hairs 140 are similar to guide hairs 130 in that they affect given hairs by making the size and shape of the given hairs similar to the size and shape of the clump hairs 140. Clump hairs 140 also have radius values, like guide hairs 130, but clump hair 140 radius values are used in a different way. A clump hair 140 radius value determines the size of a clump, as will be further discussed with reference to FIGS. 5A and 5B. (This is why a clump hair is sometimes called a clump tube.) A clump hair 140 radius value does not affect the radius value of a hair that it clumps. The radius value at the origin of a clump hair 140 has another purpose as well: it determines whether a given hair is attracted to that particular clump hair 140. If the origin of the given hair is outside of the clump hair's radius (i.e., if the given hair is outside of the "clump tube"), then the given hair is not attracted to that particular clump hair 140.

Figure 4:
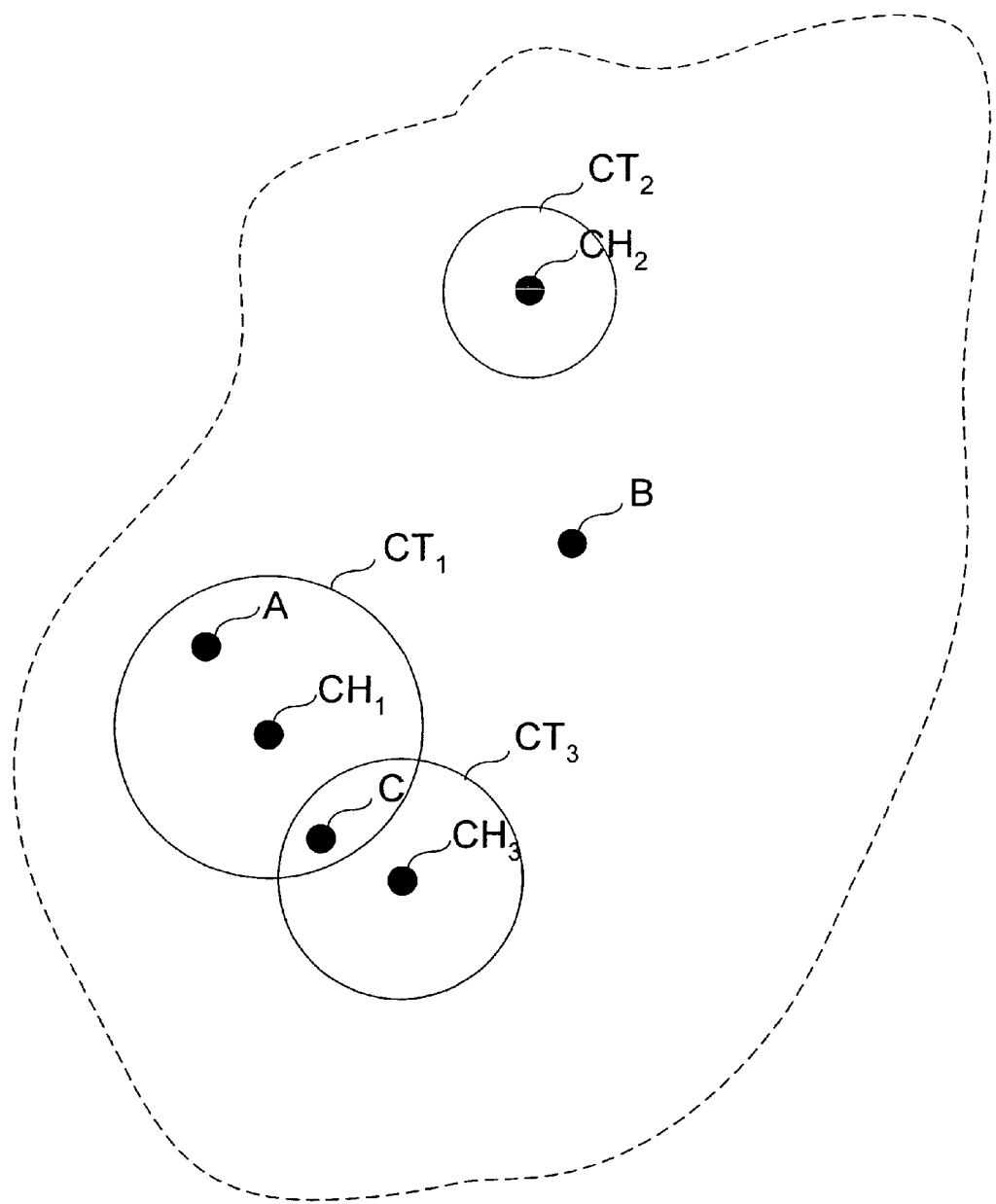
FIG. 4 illustrates an aerial view of clump hairs, clump tubes, and hair origins, according to one embodiment of the invention.

The first step in clumping is to determine 240 to which clump hairs 140 the given hair is attracted (if any). For example, FIG. 4 illustrates an aerial view of a surface model 120 with three clump hairs ($CH_1$, $CH_2$, $CH_3$), their associated clump tubes ($CT_1$, $CT_2$, $CT_3$), and the origins of three interpolated hairs (A, B, C). The origin of hair A is within $CT_1$, the origin of hair B is not within any clump tube, and the origin of hair C is within both $CT_1$ and $CT_3$. The question is to which clump hairs 140 are hairs A, B, and C attracted.

Hair A's origin is within the clump tube of only one clump hair 140, so hair A is attracted to only that clump tube's clump hair.

Hair B is not attracted to any of the clump hairs 140. When the origin of a hair is not within any clump tube, the hair is not attracted to any clump hairs 140. Alternatively, the hair is attracted to the closest clump hair 140; in this embodiment, hair B would be attracted to clump hair $CH_2$. In yet another embodiment, the hair is attracted to the clump hair 140 of the closest clump tube (which is not necessarily the closest clump hair). In one embodiment, if the origin of a hair is outside of all clump tubes and is equidistant from two or more clump tubes or clump hairs, one clump tube or clump hair 140 is randomly chosen as the clump tube or clump hair 140 to which the given hair will be attracted.

Hair C's origin is within two different clump tubes. There are a variety of different ways to determine the clumping behavior of a hair in this position. In one embodiment, a given hair can be attracted to only one clump hair 140. Thus, in this embodiment, one clump hair 140 must be chosen to which the given hair will be attracted. In FIG. 4, the choice is between $CH_1$ and $CH_3$. In one embodiment, this decision is made randomly. Alternatively, the set of clump hairs 140 from which to choose is artificially decreased so that it includes only the guide hairs 130 that were interpolated to form the given hair.

Figure 5A:
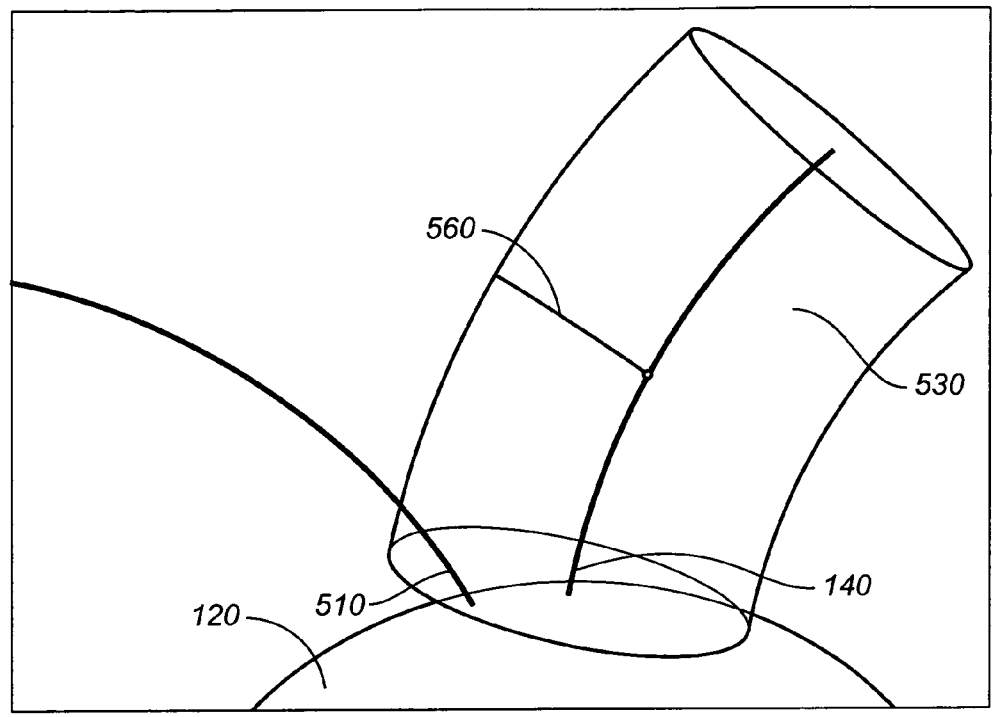
FIG. 5A illustrates a side view of a clump tube and an interpolated hair, according to one embodiment of the invention.
Figure 5B:
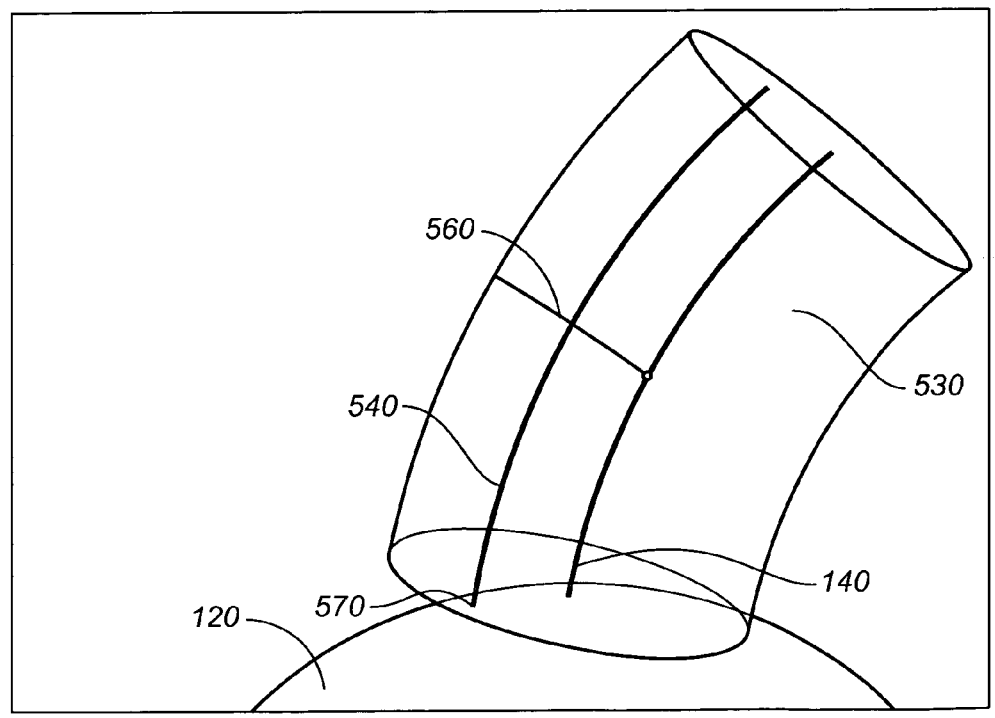
FIG. 5B illustrates a side view of the clump tube from FIG. 5A and a reference hair based on the interpolated hair of FIG. 5A and the clump tube, according to one embodiment of the invention.

Once a hair (such as an interpolated hair) has been found to be attracted to one or more clump hairs 140, the next step is to calculate 250 a reference hair for that hair relative to the clump hair 140. A reference hair represents where an original hair would be were it fully (100%) attracted to its clump hair 140 and then clumped accordingly. FIG. 5A illustrates a side view of a given hair 510, a clump hair 140, the clump hair's associated clump tube 530, the clump hair's radius value 560 at one point, and a surface model 120. FIG. 5B illustrates a side view of a reference hair 540, the reference hair's origin 570, a clump hair 140, the clump hair's associated clump tube 530, the clump hair's radius value 560 at one point, and a surface model 120.

The first step in calculating a reference hair 540 is calculating the location of its origin 570. In one embodiment, the origin 570 of a reference hair 540 is located in the same place, relative to the surface model 120, as the origin of the given hair 510. Alternatively, the origin 570 of a reference hair 540 is located elsewhere. In one embodiment, the location of the origin 570 is determined according to a procedure that yields a randomized location within a clump tube 530. This procedure will be described with reference to FIG. 6.

Figure 6:
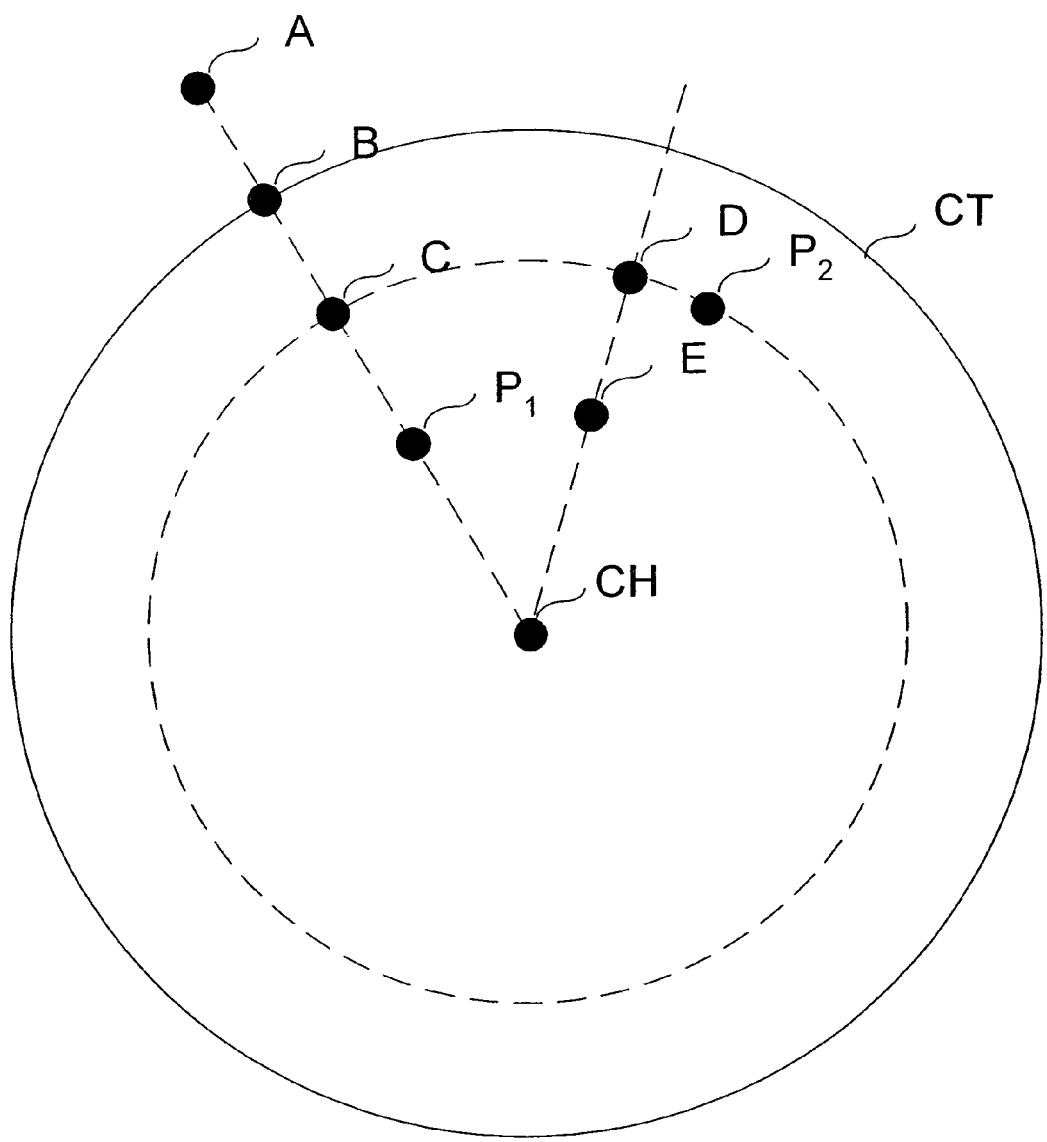
FIG. 6 illustrates one clump tube and various points used to determine a location for an origin of a reference hair, according to one embodiment of the invention.

FIG. 6 illustrates one clump tube and various points used to determine a location for an origin of a reference hair, according to one embodiment of the invention. In FIG. 6, point A represents the location of the origin of the given hair 510. In the illustrated embodiment, the procedure determines that the origin 570 of the reference hair 540 is located at point E.

In the first step of the procedure, if the origin (A) of the given hair 510 is within the clump tube 530 to which it is attracted, then the origin 570 of the reference hair 540 is placed at the origin (A) of the given hair 510. If the origin (A) of the given hair 510 is outside of the clump tube 530 to which it is attracted, as it is in FIG. 6, then the origin 570 is placed at the nearest point on the clump tube 530. In FIG. 6, this is point B. Notice that, by definition, the move from point A to point B will always be in the direction toward the clump hair 140 (i.e., toward the center of the clump tube 530).

The origin 570 is now at point B. Next, a point $P_1$ is chosen randomly along the line that radiates from the origin of the clump hair 140 and passes through point B such that $P_1$ is located between the center and the edge of the clump tube 530. The origin 570 is then moved to point C, which is a particular distance from point B straight toward $P_1$. This distance is given by the product of a percentage and the distance between point B and point $P_1$. This percentage is known as "clumps radius randomness" and is specified by the user or is chosen at random. Note that if the percentage is 0%, point B and point C will be in the same place.

The origin 570 is now at point C. A point $P_2$ is then chosen randomly along the circle that has the origin of the clump hair 140 as its center and that passes through point C. The origin 570 is then moved to point D, which is a particular distance from point C along the circle toward $P_2$. This distance is given by the product of a percentage and the distance along the circle between point C and point $P_2$. This percentage is known as "clumps angle randomness" and is specified by the user or is chosen at random. Note that if the percentage is 0%, point C and point D will be in the same place.

The origin 570 is now at point D. The origin 570 is again moved, this time along the line that radiates from the origin of the clump hair 140 and passes through point D, to point E. The movement is determined by a variable called "clumps core density bias," which is specified by the user or chosen at random. The value of clumps core density bias can move the origin 570 towards the origin of the clump hair 140, move the origin 570 away from the origin of the clump hair 140, or leave the origin 570 where it is (i.e., at point D).

Now that the location of the origin 570 of the reference hair 540 has been determined, the next step is to determine the locations of the other points on the reference hair 540. An interpolation through these points is then used as the curve of the reference hair 540. In one embodiment, the locations of the other points on the reference hair 540 are determined as follows.

The direction in which the point on the reference hair 540 will be located, relative to the clump hair 140, is determined. In one embodiment, the following procedure is used to determine this direction. First, a local reference frame is calculated at the point on the clump hair 140 that "corresponds to" the point on the reference hair 540 whose location is being determined (this will be further discussed below). A reference frame describes a coordinate system and comprises an origin point and an orthonormal basis of three vectors. Together, the origin point and these vectors define a local space and enable the translation of a location in local space to a location in world space (i.e., in the global coordinate system).

Given a point on a curve, there are several ways to compute an orthonormal basis of three vectors, such as Frenet frames and parallel transport frames. In a preferred embodiment, parallel transport frames are used to compute these vectors. The initial frame, located at the origin of the hair, is determined based on the surface out of which the hair grows. The frame uses the two partial derivatives of the surface at the hair's origin, along with the tangent to the hair at the hair's origin. If the two partial derivatives are not orthonormal, then they are normalized and minimally rotated so that they are orthogonal to the initial tangent and to each other.

Since parallel transport is computationally intense, in one embodiment, the vectors for the other frames are approximated using the projection method. The projection method projects the perpendicular vectors of one frame (at a first point of the curve) onto the normal plane of another frame (at a second point of the curve) and then normalizes the perpendicular vectors. In other words, the projection method determines a frame at the beginning of a curve and then determines frames for other points along the curve's length. The first and second points define an "interval" of the curve. In order for the projection method to work properly, the curve tangent should deviate less than 90 degrees between the beginning of the interval and the end of the interval.

In one embodiment, each interval size is calculated so that the curve tangent deviates less than 90 degrees over the interval. If a curve is considered to be a parameterized set of functions (or tracks) with the following equation $$\gamma(t)=[x(t),y(t),z(t),\dots]$$

where t is the parameter, then a valid interval for a projection is determined by solving the following equation for the variable t:

$$\gamma'(t)\cdot\gamma'(t_o)=0$$

where $t_o$ is the starting point of the interval. Since the dot product of two vectors is zero only when the vectors are perpendicular, this equation specifies what parameter values of t on the curve yield tangents that are perpendicular to the tangents at $t_o$.

The value for t that is found is the location of the first failure point (i.e., the location where the curve tangent deviates 90 degrees or more between the beginning of the interval and the end of the interval. For most curve types, this equation has multiple solutions. The correct solution is the one with the smallest value of t in the interval ($t_o$, 1]. If there is no solution in this range or otherwise, then t is given the value 1. That means that the remainder of the curve does not turn enough to cause the frame projections to fail.

Since the value for t found above is the location of the first failure point, the interval is determined using a value between $t_o$ and t. When t<1, the parameter value used for the interval is ½($t_o$+t). Thus, the interval actually used is half the size of the interval that would cause the projection method to fail.

A frame is computed for each parameter value corresponding to each CV along the entire length of the curve. In one embodiment, the frames are cached internally as additional curve tracks. This makes it faster to evaluate a frame for a particular point of the curve later on, since the cached frames can be used rather than re-computing the frames starting at the beginning of the hair. Frenet frames, parallel transport frames, and the projection method of approximating parallel transport frames are known to those of ordinary skill in the relevant art and are further described in "Parallel Transport Approach to Curve Framing" by Andrew J. Hanson and Hui Ma, Indiana University Computer Science Department Technical Report 425, February 1995.

Next, a vector is added to the point on the clump hair 140 that corresponds to the point on the reference hair 540, using the local reference frame at that point. This vector, called the reference offset, is the vector pointing from the origin of the clump hair 140 to the origin 570 of the reference hair 540, encoded in terms of the local reference frame of the origin of the clump hair 140. The point on the reference hair 540 will be located somewhere on this vector.

The next step is to determine how far along this vector reference hair point will be located. A percentage is calculated equal to the distance between the reference hair's origin 570 ($O_{RH}$) and the clump hair's origin ($O_{CH}$) divided by the clump hair's radius at its origin ($R_{CHO}$).

$$\text{percentage}=|O_{RH}-O_{CH}|/R_{CHO}$$

For example, assume that the percentage is 70%. This means that the reference hair's origin 570 is located 70% of the way on the path between the clump hair's origin and the edge of the clump tube 530. The reference hair point will be located along the vector described above at a distance of $$\text{percentage}*R_{CHP}$$

where $R_{CHP}$ is the radius of the clump hair 140 at the point that corresponds to the reference hair point whose location is being determined.

As mentioned above, the process of determining the location of a point on a reference hair 540 comprises identifying a "corresponding" point on a clump hair 140. If the clump hair 140 and the reference hair 540 have the same number of control vertices, then the first control vertex of the clump hair 140 corresponds to the first control vertex of the reference hair 540, the second control vertex of the clump hair 140 corresponds to the second control vertex of the reference hair 540, and so on. If the clump hair 140 and the reference hair 540 have different numbers of vertices, but the number of clump hair 140 vertices is a multiple of the number of reference hair vertices 540, then certain clump hair 140 vertices do not correspond to any reference hair 540 vertices. For example, if there are twice as many clump hair 140 vertices as there are reference hair 540 vertices, then every other clump hair 140 vertex corresponds to a reference hair 540 vertex. The rest of the clump hair 140 vertices do not correspond to any reference hair 540 vertices.

As mentioned above, the reference hair 540 represents where the original hair 510 would be were it fully (100%) attracted to the clump hair 140 and then clumped accordingly. However, the fur engine 110 allows for varying degrees of attraction between each original hair 510 and each clump hair 520. Not every original hair 510 will be fully attracted to every clump hair 140; more specifically, not every point in the original hair 510 will be fully attracted to its corresponding point in the clump hair 140. The degree to which a given hair 510 is attracted to a clump hair 140 is called lumpiness. A clumpiness value can range from 0% (not attracted at all) to 100% (fully attracted). Like other characteristics of a hair, clumpiness values can differ from point to point within a single hair. These values are collectively known as a clumpiness track.

The next step in clumping is to calculate 260 the clumpiness value at each point in the original hair 510. In one embodiment, the final clumpiness value of a point in an original hair 510 is the product of four clumpiness values: the clumpiness value initially assigned to that point in the original hair 510; the clumpiness value of the corresponding points in the guide hairs 130 that were used to interpolate the original hair 510; the clumpiness value of the clump hair 140 to which the original hair 510 is attracted; and the clumpiness value of the style curve (this will be further discussed below). Note that since these clumpiness values are multiplied together, if any of them is equal to 0%, then the original hair 510 will not be attracted at all to the clump hair 140.

One factor in the final clumpiness value of a point in an original hair 510 is the clumpiness value initially assigned to that point in the original hair 510. This value may be initially assigned based on, for example, a texture map over the surface model 120 (specifying clumpiness values of hairs growing out of that area), clumpiness of parent guide hairs 130, or clumpiness of the clump hairs 140 which are closest. In the second method, the given hair's clumpiness value is interpolated from the parent guide hairs 130 using the same blending weights that determined the given hair's original interpolated position.

Another factor in the final clumpiness value of a point in an original hair 510 is the clumpiness value of the clump hair 140 to which the original hair 510 is attracted. In one embodiment, the clumpiness value of a clump hair 140 is assigned by the user, either separately (for each clump hair 140) or in an aggregate way (such as by using a texture map). As discussed above, the clumpiness value can be constant along the length of the clump hair 140 or it can vary. One method for specifying a varying clumpiness is to use the settings "clumpiness base min," "clumpiness base max." "clumpiness tip min," and "clumpiness tip max." These settings operate as follows. A clumpiness value is chosen randomly from the range clumpiness base min to clumpiness base max and is assigned to the origin of the clump hair 140. A clumpiness value is chosen randomly from the range clumpiness tip min to clumpiness tip max and is assigned to the tip of the clump hair 140. Once clumpiness values have been assigned to the origin and to the tip of the clump hair 140, clumpiness values for the rest of the points in the clump hair 140 are ramped linearly from the base clumpiness value to the tip clumpiness value.

This linear track can then be modified using the settings "lumpiness base-tip bias" or "lumpiness min/max bias." Clumpiness base-tip bias adjusts all of the clumpiness values in the track toward either the base clumpiness value or toward the tip clumpiness value. Clumpiness min/max bias adjusts all of the clumpiness values in the track toward either the min clumpiness values or the max clumpiness values.

In one embodiment, the clumpiness value initially assigned to a clump hair 140 (by using any method) may be further modified based on one or more settings. These settings are specified by the user or they are chosen at random. "Clumps percent" determines what percentage of the clump hairs 140 causes clumping. This is equivalent to multiplying the initial clumpiness values of the specified percentage of clump hairs 140 by 1 and multiplying the initial clumpiness values of the rest of the clump hairs 140 by 0. The probability that a particular clump hair 140 will be within the set that will cause clumping is equal to clumps percent.

Once the final clumpiness value at each point in the original hair 510 has been calculated 260, the next step is to clump 270 the original hair 510 based on the reference hair and the original hair's clumpiness track. In one embodiment, the following method is used to calculate the clumped location of each point in the original hair 510 (except for the hair's origin, which does not move). A point in the original hair 510 is moved a particular distance toward the location of the corresponding point in the reference hair 540. The distance moved is equal to the product of the clumpiness value at that point in the original hair 510 (0%-100%) and the distance between the point in the original hair 510 and the corresponding point in the reference hair 540. Once the clumped location of each point of the original hair 510 has been calculated, a curve is interpolated through the points. This curve is the original hair 510 after it has been clumped.

Styling

In the styling phase, the clumped interpolated hair is further modified to produce an output clumped interpolated hair 170. Applying 280 a style to a hair consists of adjusting the hair's vertices and interpolated a new curve through them. Three common styles are twists, curls, and kinks. In one embodiment, a hair is twisted, making it spiral around a clump hair. Alternatively, a hair is curled, making it spiral around its own previous position. In yet another embodiment, a hair is kinked, whereby its vertices are displaced based on a noise signal that varies in frequency and amplitude.

Although the invention has been described in considerable detail with reference to certain embodiments thereof, other embodiments are possible as will be understood to those skilled in the art.

What is claimed is:

1. A computer-implemented method for modifying a given hair, the given hair comprising an origin, a plurality of vertices, a vertex of the given hair having a clumpiness value, the method comprising:

determining a clump hair having an origin, a radius extending from the origin, and a clumpiness value, wherein the origin of the given hair is located within the radius of the clump hair;

determining a reference hair that includes a plurality of vertices with associated location and direction values, wherein determining the reference hair includes:

determining an origin of the reference hair by translating the origin of the given hair towards the origin of the clump hair;

determining location and direction values for a plurality of vertices of the clump hair; and determining location and direction values for the reference hair from location and direction values at corresponding vertices of the clump hair;

modifying the given hair by modifying one or more vertices of the given hair according to the location and direction values of the reference hair, the clumpiness value of the clump hair and the clumpiness value of the given hair; and storing the modified given hair.

2. The method of claim 1, further comprising determining the given hair by interpolating a plurality of guide hairs that include a plurality of vertices.

3. The method of claim 1, further comprising applying a style to the modified given hair by adjusting values at the vertices of the given hair so that the interpolated values correspond to the applied style.

4. A computer-implemented method for modifying a given hair, the given hair comprising an origin, a plurality of vertices, a vertex of the given hair having a clumpiness value, the method comprising:

determining a clump hair having an origin, a radius extending from the origin, a plurality of vertices, each vertex having a clumpiness value, wherein the origin of the given hair is located within the radius of the clump hair;

determining locations for vertices of a reference hair that includes a plurality of vertices, wherein an origin of the reference hair lies between the origin of the given hair and the origin of the clump hair; and for each vertex of the given hair: determining a new location of the vertex, the new location being between the location of the vertex of the given hair and a location of a corresponding vertex of the reference hair, according to the clumpiness value of the vertex of the given hair, the clumpiness value of the corresponding vertex of the reference hair, and the clumpiness value of a corresponding vertex of the clump hair; and storing the new locations of the vertices of the given hair.

5. The method of claim 4, wherein determining the locations for vertices of the reference hair includes:
  determining a first location of a first vertex of the reference hair according to a radius of a first corresponding vertex of the clump hair; and
  determining a second location of a second vertex of the reference hair by:
    determining a vector that intersects the clump hair at a second corresponding vertex of the clump hair; and
    determining a distance along the vector, wherein the second location of the second vertex of the reference hair is on the determined vector at the determined distance.

6. A computer-implemented method for modifying a given hair, the given hair comprising a plurality of vertices, a vertex of the given hair having a clumpiness value, the method comprising:
  determining locations for vertices of a reference hair, wherein determining the locations for vertices of the reference hair includes:
  determining a first location of a first vertex of a reference hair according to a radius of a first corresponding vertex of a clump hair; and
  determining a second location of a second vertex of the reference hair by:
    determining a vector that intersects the clump hair at a second corresponding vertex of the clump hair, wherein determining the vector that intersects the clump hair at the second corresponding vertex comprises: determining a local reference frame at the second corresponding vertex; and determining a reference offset vector; and
    determining a distance along the vector, wherein the second location of the second vertex of the reference hair is on the determined vector at the determined distance;
  for each vertex of the given hair: determining a new location of the vertex, the new location being between the location of the vertex of the given hair and a location of a corresponding vertex of the reference hair, according to a clumpiness value of the vertex of the given hair; and
  storing the new locations of the vertices of the given hair.

7. The method of claim 5, wherein determining the distance along the vector comprises determining a distance between the first location of the first vertex of the reference hair and a location of the first corresponding vertex of the clump hair.

8. A computer-implemented method for modifying a given hair, the given hair comprising a plurality of vertices, a vertex of the given hair having a clumpiness value, the method comprising:
  determining locations for vertices of a reference hair, wherein determining the locations for vertices of the reference hair includes:
    determining a first location of a first vertex of a reference hair according to a radius of a first corresponding vertex of a clump hair; and
    determining a second location of a second vertex of the reference hair by:
      determining a vector that intersects the clump hair at a second corresponding vertex of the clump hair; and
      determining a distance along the vector, wherein the second location of the second vertex of the reference hair is on the determined vector at the determined distance;
  for each vertex of the given hair: determining a new location of the vertex, the new location being between the location of the vertex of the given hair and a location of a corresponding vertex of the reference hair, according to a clumpiness value of the vertex of the given hair; and determining the clumpiness value of the vertex of the given hair according to a clumpiness value of a corresponding vertex of the clump hair; and
  storing the new locations of the vertices of the given hair.

9. The method of claim 4, further comprising:
  determining a first location of a first vertex of the given hair on a surface by using rejection sampling to reject one or more sampled locations that lie in compressed regions having relatively small surface tangents; and
  determining a second location of a second vertex of the given hair by:
    determining a triangular mesh whose vertices comprise a plurality of locations of a plurality of origins of a plurality of guide hairs;
    determining a triangle of the triangular mesh that contains the first location of the first vertex of the given hair;
    determining a plurality of guide hairs whose origins form the vertices of the triangle; and
    interpolating the plurality of guide hairs.

10. The method of claim 9, further comprising:
  for each vertex of the given hair:
    determining the clumpiness value of the vertex according to a clumpiness value of a corresponding vertex of one of the plurality of guide hairs.

11. The method of claim 4, further comprising:
  for each vertex of the given hair:
    determining the clumpiness value of the vertex according to an initial clumpiness value of the vertex.

12. The method of claim 4, further comprising:
  for each vertex of the given hair:
    determining the clumpiness value of the vertex according to a plurality of clumpiness values of a plurality of vertices of the given hair.

13. A computer-implemented method for generating a hairstyle, the hairstyle comprising a plurality of hairs, the method comprising modifying a plurality of given hairs; a given hair comprising an origin, a plurality of vertices, a vertex of a given hair having a clumpiness value, wherein modifying the plurality of given hairs comprises:
  for each given hair:
    determining a clump hair having an origin, a radius extending from the origin, a plurality of vertices, each vertex having a clumpiness value, wherein the origin of the given hair is located within the radius of the clump hair;
    determining locations for vertices of a reference hair that includes an origin and a plurality of vertices, wherein the origin of the reference hair lies between the origin of the given hair and the origin of the clump hair;
    modifying the given hair by modifying one or more vertices of the given hair according to the clumpiness values of the vertices of the given hair, the clumpiness values of corresponding vertices of the reference hair, and the clumpiness values of corresponding vertices of the clump hair, wherein modifying the one or more vertices of the given hair includes calculating differences between locations of the one or more vertices of the given hair and locations of corresponding vertices of the reference hair adjusting values at the one or more vertices of the given hair so that the interpolated values correspond to the generated hairstyle; and storing the adjusted values.

14. A computer-implemented method for generating a hairstyle, the hairstyle comprising a plurality of hairs, the method comprising:

generating a first hairstyle by:
modifying a plurality of given hairs, a given hair comprising an origin, a plurality of vertices, a vertex of a given hair having a clumpiness value, wherein modifying the plurality of given hairs comprises:
for each given hair:
modifying the given hair by modifying one or more vertices of the given hair according to the clumpiness values of vertices of the given hair, clumpiness values of corresponding vertices of a reference hair, and clumpiness values of corresponding vertices of a clump hair; and modifying the first hairstyle by:
for each hair in the first hairstyle:
modifying the hair by modifying one or more vertices of the hair according to the clumpiness values of vertices of the given hair, clumpiness values of corresponding vertices of the reference hair, and clumpiness values of corresponding vertices of the clump hair so that an interpolation of the modified vertices corresponds to the generated hairstyle; and storing the modified first hairstyle.

15. The method of claim 14, further comprising: determining locations for vertices of the reference hair, wherein an origin of the reference hair lies between the origin of the given hair and an origin of the clump hair.

16. A computer-implemented method for modifying a given strand, the given strand comprising an origin, a plurality of vertices, a vertex of the given strand having a clumpiness value, the method comprising:

for each vertex of the given strand:
determining a clump strand having an origin, a radius extending from the origin, a plurality of vertices, each vertex having a clumpiness value, wherein the origin of the given strand is located within the radius of the clump strand;

determining locations for vertices of a reference strand that includes an origin and a plurality of vertices, wherein the origin of the reference strand lies between the origin of the given strand and the origin of a clump strand;

determining a new location of the vertex, the new location being between the location of the vertex of the given strand and a location of a corresponding vertex of the reference strand, according to the clumpiness value of the vertex of the given strand, the clumpiness value of a corresponding vertex of the reference strand, and the clumpiness value of a corresponding vertex of the clump strand; and storing the new location of the vertex.

17. A computer-implemented method for generating an arrangement of strands, the arrangement of strands comprising a plurality of strands, the method comprising modifying a plurality of given strands, a given strand comprising an origin, a plurality of vertices, a vertex of a given strand having a clumpiness value, wherein modifying the plurality of given strands comprises:

for each given strand:
determining a clump strand having an origin, a radius extending from the origin, a plurality of vertices, each vertex having a clumpiness value, wherein the origin of the given strand is located within the radius of the clump strand;

determining locations for vertices of a reference strand that includes an origin and a plurality of vertices, wherein the origin of the reference strand lies between the origin of the given strand and the origin of a clump strand; and modifying the given strand by modifying one or more vertices of the given strand according to the clumpiness value of the vertex of the given strand, the clumpiness value of a corresponding vertex of the reference strand, and the clumpiness value of a corresponding vertex of the clump strand; and storing the modified given strand.

18. A computer-implemented method for generating an arrangement of strands, the arrangement of strands comprising a plurality of strands, the method comprising:

generating a first arrangement of strands by:
modifying a plurality of given strands, a given strand comprising an origin, a plurality of vertices, a vertex of a given strand having a clumpiness value, wherein modifying the plurality of given strands comprises:
for each given strand:
modifying the given strand by modifying one or more vertices of the given strand according to the clumpiness values of vertices of the given strand, clumpiness values of corresponding vertices of a reference strand, and clumpiness values of corresponding vertices of a clump strand; and modifying the first arrangement of strands by:
for each strand in the first arrangement of strands:
modifying the strand by modifying one or more vertices of the strand so that an interpolation of the modified vertices corresponds to a styling of the strand, wherein the styling includes a spiraling of the strand; and storing the modified first arrangement of strands.

19. The computer-implemented method of claim 1, further comprising:

determining a first location of a first vertex of the given hair on a surface by using rejection sampling to reject one or more sampled locations that lie in compressed regions having relatively small surface tangents.

20. The computer-implemented method of claim 1, wherein modifying the given hair includes calculating differences between location and direction values of the reference hair at a plurality of vertices and corresponding location and direction values of the given hair.

21. The method of claim 4, further comprising:

determining a first location of a first vertex of the given hair on a surface by using rejection sampling to reject one or more sampled locations that lie in compressed regions having relatively small surface tangents.

22. The computer-implemented method of claim 14, wherein the interpolation of the modified vertices spirals about the reference hair.

23. The computer-implemented method of claim 14, wherein modifying the one or more vertices of the hair includes calculating differences between locations of the one or more vertices of the hair and locations of corresponding vertices of the reference strand.

24. The computer-implemented method of claim 18, wherein modifying the one or more vertices of the given strand includes calculating differences between locations of the one or more vertices of the given strand and locations of corresponding vertices of the reference strand.

25. The method of claim 1, wherein the reference hair represents where the given hair would be located if the given hair was fully attracted to the clump hair.

26. The method of claim 4, wherein the reference hair represents where the given hair would be located if the given hair was fully attracted to the clump hair.

27. The method of claim 6, wherein the reference hair represents where the given hair would be located if the given hair was fully attracted to the clump hair.

28. The method of claim 8, wherein the reference hair represents where the given hair would be located if the given hair was fully attracted to the clump hair.

29. The method of claim 13, wherein the reference hair represents where the given hair would be located if the given hair was fully attracted to the clump hair.

30. The method of claim 13, wherein the location of the origin of the reference hair is the same as the location of the given hair or the location of the clump hair.

31. The method of claim 14, wherein the reference hair represents where the given hair would be located if the given hair was fully attracted to the clump hair.

32. The method of claim 15, wherein the location of the origin of the reference hair is the same as the location of the given hair or the location of the clump hair.

33. The method of claim 16, wherein the reference strand represents where the given strand would be located if the given strand was fully attracted to the clump strand.

34. The method of claim 16, wherein the location of the origin of the reference strand is the same as the location of the given strand or the location of the clump strand.

35. The method of claim 17, wherein the reference strand represents where the given strand would be located if the given strand was fully attracted to the clump strand.

36. The method of claim 17, wherein the location of the origin of the reference strand is the same as the location of the given strand or the location of the clump strand.

37. The method of claim 18, wherein the reference strand represents where the given strand would be located if the given strand was fully attracted to the clump strand.

* * * * *